United States Patent
Hagspiel et al.

(10) Patent No.: US 10,353,833 B2
(45) Date of Patent: Jul. 16, 2019

(54) CONFIGURABLE ORDERING CONTROLLER FOR COUPLING TRANSACTIONS

(71) Applicant: International Business Machines Corporation, Armonk, NY (US)

(72) Inventors: Norbert Hagspiel, Tuebingen (DE); Sascha Junghans, Ammeruch (DE); Matthias Klein, Wappingers Falls, NY (US); Girish G. Kurup, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/646,340

(22) Filed: Jul. 11, 2017

(65) Prior Publication Data

US 2019/0018803 A1    Jan. 17, 2019

(51) Int. Cl.
  *G06F 13/16* (2006.01)
  *G06F 13/28* (2006.01)
  *G06F 13/40* (2006.01)
  *G06F 13/42* (2006.01)

(52) U.S. Cl.
  CPC ...... *G06F 13/1626* (2013.01); *G06F 13/1642* (2013.01); *G06F 13/28* (2013.01); *G06F 13/4013* (2013.01); *G06F 13/42* (2013.01)

(58) Field of Classification Search
  CPC .... G06F 9/3855; G06F 9/3857; G06F 9/5016; H04L 63/0227; H04L 67/10
  USPC .............. 711/103, 105, 137; 709/201; 710/5
  See application file for complete search history.

(56) References Cited

U.S. PATENT DOCUMENTS

| | | | |
|---|---|---|---|
| 6,266,731 B1 | 7/2001 | Riley | |
| 6,557,068 B2 | 4/2003 | Riley | |
| 6,615,295 B2 | 9/2003 | Shah | |
| 6,745,308 B2 | 6/2004 | Frank | |
| 6,816,934 B2 | 11/2004 | Riley | |
| 7,047,372 B2 | 5/2006 | Zeitler | |
| 7,099,986 B2 | 8/2006 | Pettey | |

(Continued)

OTHER PUBLICATIONS

Appendix P List of IBM Patents or Applications Treated as Related. Two Pages. Dated Nov. 8, 2017.

(Continued)

*Primary Examiner* — Faisal M Zaman
(74) *Attorney, Agent, or Firm* — Edward P. Li

(57) ABSTRACT

A computer system with a configurable ordering controller for coupling transactions. The computer system comprises a coupling device configured to send first data packets with an unordered attribute being set to an ordering controller. The computer system further comprises the coupling device configured to send second data packets with requested ordering to the ordering controller, back-to-back after the first data packets, without waiting until all of the first data packets are completed. The computer system further comprises the ordering controller configured to send the first data packets to a memory subsystem in a relaxed ordering mode, wherein the ordering controller sends the first data packets to the memory subsystem in an arbitrary order, and wherein the ordering controller sends the second data packets to the memory subsystem after sending all of the first data packets to the memory subsystem.

10 Claims, 6 Drawing Sheets

(56) References Cited

U.S. PATENT DOCUMENTS

| | | | |
|---|---|---|---|
| 7,124,231 B1* | 10/2006 | Garner | G06F 13/4059 |
| | | | 710/310 |
| 7,464,207 B2 | 12/2008 | Riley | |
| 7,587,542 B2 | 9/2009 | Riley | |
| 7,721,023 B2* | 5/2010 | Irish | G06F 13/12 |
| | | | 710/36 |
| 7,987,306 B2 | 7/2011 | Muller | |
| 8,108,584 B2 | 1/2012 | Harriman | |
| 8,199,759 B2 | 6/2012 | Singhal | |
| 9,032,103 B2 | 5/2015 | Ajanovic | |
| 9,158,691 B2 | 10/2015 | Saund | |
| 9,229,896 B2 | 1/2016 | Balkan et al. | |
| 9,489,304 B1 | 11/2016 | Swarbrick | |
| 9,537,799 B2 | 1/2017 | Lih et al. | |
| 9,641,448 B1* | 5/2017 | Telfer | H04L 47/624 |
| 9,858,221 B2* | 1/2018 | Osborn | G06F 13/28 |
| 2002/0073258 A1 | 6/2002 | Riley | |
| 2002/0083247 A1* | 6/2002 | Shah | G06F 13/1626 |
| | | | 710/112 |
| 2003/0145136 A1* | 7/2003 | Tierney | G06F 9/3834 |
| | | | 710/3 |
| 2003/0159013 A1 | 8/2003 | Frank | |
| 2003/0225956 A1 | 12/2003 | Riley | |
| 2004/0199700 A1* | 10/2004 | Clayton | G06F 13/385 |
| | | | 710/305 |
| 2005/0033893 A1 | 2/2005 | Pettey | |
| 2005/0138260 A1* | 6/2005 | Love | G06F 13/4081 |
| | | | 710/306 |
| 2005/0262419 A1* | 11/2005 | Becker | H04H 20/28 |
| | | | 714/758 |
| 2005/0273534 A1 | 12/2005 | Riley | |
| 2006/0031621 A1 | 2/2006 | Riley | |
| 2006/0075119 A1* | 4/2006 | Hussain | H04L 49/90 |
| | | | 709/227 |
| 2008/0059672 A1 | 3/2008 | Irish | |
| 2008/0082685 A1* | 4/2008 | Dabagh | H04L 69/22 |
| | | | 709/238 |
| 2009/0113082 A1* | 4/2009 | Adar | G06F 13/387 |
| | | | 710/15 |
| 2010/0332756 A1* | 12/2010 | Yarch | G06F 11/1666 |
| | | | 711/119 |
| 2012/0260032 A1* | 10/2012 | Chiu | G06F 13/1626 |
| | | | 711/105 |
| 2013/0054867 A1* | 2/2013 | Nishita | G06F 13/14 |
| | | | 710/316 |
| 2013/0111084 A1* | 5/2013 | Wang | H04L 67/1004 |
| | | | 710/54 |
| 2014/0173218 A1 | 6/2014 | Saund | |
| 2015/0281126 A1* | 10/2015 | Regula | G06F 13/4022 |
| | | | 709/212 |
| 2017/0160929 A1* | 6/2017 | Ayandeh | G06F 3/061 |
| 2018/0365180 A1* | 12/2018 | Craddock | G06F 12/1081 |

OTHER PUBLICATIONS

Hagspiel et al. Original U.S. Appl. No. 15/806,407, filed Nov. 8, 2017.

"PCI Express Base Specification Revision 1.0" Apr. 29, 2002. Copyright PCI-SIG. (Year: 2002). Examiner cited for DE820160181US02 on Dec. 19, 2018. Three hundred seventy five pages.

"PCI Express Base Specification Revision 1.0a". Apr. 15, 2003. Copyright PCI-SIG. (Year: 2003). Examiner cited for DE820160181US02 on 1211912018. Four hundred twenty six pages.

"PCI Express Base Specification Revision 3.0". Nov. 10, 2010. Copyright PCI-SIG. (Year: 2010). Examiner cited or DE820160181US02 on Dec. 19, 2018. Twenty five pages.

Lawley, J. "Understanding Performance of PCI Express Systems". White Paper: UltraScale and Virtex-7 FPGAs. XILINX WP350 (v1.2) Oct. 28, 2014. Examiner cited for DE820160181US02 on Dec. 19, 2018. Sixteen pages.

* cited by examiner

CONFIGURABLE ORDERING CONTROLLER FOR COUPLING TRANSACTIONS

BACKGROUND

The present invention relates generally to a short distance coupling environment, and more particularly to latency reduction in a short distance coupling environment.

For short distance coupling, like many other I/O protocols, it needs to be ensured, from a high level perspective, that a transaction is only signaled to be completed after all payloads have arrived. To accomplish this, ordering mechanisms are applied by the memory subsystem and the coupling message hardware side. For a coupling device (for example, an integrated cluster bus (ICB)), a short distance coupling protocol, two implementations for accomplishing this goal in current designs are as follows. First, the coupling device sends in all packets, including payload packets and signaling packets, into a memory subsystem and requests all the packets to be ordered. As a result, an ordering controller (for example, a PCI bus controller (PBC)) will ensure that each individual packet (including each of the payload packets) will be ordered. The first implementation results in unnecessary ordering and a significant throughput bottleneck. Second, the coupling device sends in all payload packets which are unordered and waits until all of the payload packets are complete; then, the coupling device sends in signaling packets. The second implementation has better throughput than the first implementation. The second implementation is a chosen protocol for IBM z13®.

SUMMARY

A computer system with a configurable ordering controller for coupling transactions is provided. The computer system comprises a coupling device configured to send first data packets with an unordered attribute being set to an ordering controller. The computer system further comprises the coupling device configured to send second data packets with requested ordering to the ordering controller, back-to-back after the first data packets, without waiting until all of the first data packets are completed. The computer system further comprises the ordering controller configured to send the first data packets to a memory subsystem in a relaxed ordering mode, wherein the ordering controller sends the first data packets to the memory subsystem in an arbitrary order, and wherein the ordering controller sends the second data packets to the memory subsystem after sending all of the first data packets to the memory subsystem.

A method for coupling transactions with a configurable ordering controller in a computer system is provided. The method includes sending, by a coupling device, first data packets with an unordered attribute being set to an ordering controller. The method further includes sending, by the coupling device, second data packets with requested ordering to the ordering controller, back-to-back after the first data packets, without waiting until all of the first data packets are completed. The method further includes sending, by the ordering controller, the first data packets to a memory subsystem in a relaxed ordering mode, wherein the ordering controller sends the first data packets to the memory subsystem in an arbitrary order, and wherein the ordering controller sends the second data packets to the memory subsystem after sending all of the first data packets to the memory subsystem.

DETAILED DESCRIPTION

Figure 1:
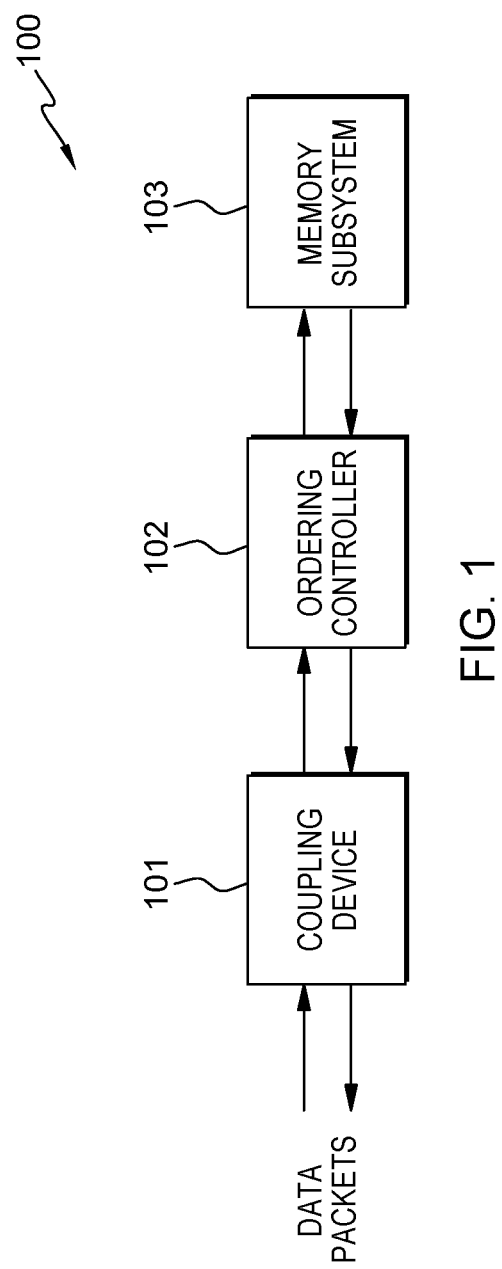
FIG. 1 is a diagram illustrating a short distance coupling environment, in accordance with one embodiment of the present invention.

FIG. 1 is a diagram illustrating short distance coupling environment 100. Short distance coupling environment 100 includes coupling device 101 (for example, an integrated cluster bus (ICB)), ordering controller 102 (for example, a PCI bus controller (PBC)), and memory subsystem 103 (for example, an level 3 (L3) cache) of a computer system. Ordering controller 102 sits in between coupling device 101 (a sender of payload packets and signaling packets) and memory subsystem 103 (a receiver of payload packets and signaling packets). In an embodiment of the present invention, Ordering controller 102 sends in first data packets (for example, payload packets) and second data packets (for example, signaling packets) back-to-back and reinterprets the unordered attribute of first data packets (for example, payload packets) as relaxed ordering. All memory commands with a flag of relaxed ordering are sent unordered towards each other into memory subsystem 103. The flag is used by coupling device 101 for commands of the first data packets (for example, the payload packets), in the same way as in the second current implementation mentioned previously in this document. However, unlike in the second current implementation, coupling device 101 does not wait for completions of the first data packets (for example, the payload packets), and coupling device 101 sends in all the second data packets (for example, the signaling packets), which are without the unordered/relaxed ordering flag being set, back-to-back after the first data packets (for example, the payload packets). For these the second data packets (for example, the signaling packets), ordering controller 102 will make sure that all preceding packets (the first data packets), which are with the relaxed ordering bit set, have completed successfully. Therefore, an operation for the second data packets can only be seen after all the first data packets have completed. Ordering controller 102 includes a mode bit to decide whether an unordered bit of a certain bus interface shall be treated as truly unordered or as the new relaxed ordering mechanism. The advantage of the implementation in the present invention is reduced latency for coupling messages.

The present invention discloses an implementation in the nest ordering logic to optimize the performance of coupling messages while still guaranteeing the required ordering. An embodiment of the present invention introduces a relaxed ordering matrix mode for the first data packets (for example, the payload packets). In the treatment of unordered as relaxed ordering in ordering controller 102, the ordering is implemented as a matrix of dependencies in ordering controller 102; direct memory accesses (DMAs) with the relaxed ordering do not honor or have any ordering dependencies; direct memory accesses (DMAs) with the relaxed ordering set ordering dependencies for other (i.e., succeeding) commands; regularly ordered commands (for which no unordered and no relaxed ordered indications are set) are ordered behind relaxed commands (which have relaxed ordered bits set in the relaxed ordering matrix). Therefore, even though the first data packets (for example, the payload packets) and the second data packets (for example, the signaling packets) are sent back-to-back, ordering between the first data packets (for example, the payload packets) and the second data packets (for example, the signaling packets) is guaranteed.

Ordering controller 102 has a set of Finite State Machines (FSMs) to handle the processing of incoming commands. Each FSM handles a single command at a time. Each incoming command is assigned to one of the FSMs.

One benefit of the present invention is latency reduction in a short distance coupling environment. The reason of the latency reduction is that coupling device 101 does not wait for completions of the first data packets (for example, the payload packets) and sends the second data packets (for example, the signaling packets) back-to-back. Another benefit of the present invention is that the implementation of the present invention requires no design change for coupling device 101.

Before detailed description of the embodiment of the present invention is given, two current implementations for coupling transactions are described with reference to FIG. 2, FIG. 3, and FIG. 4.

Figure 2:
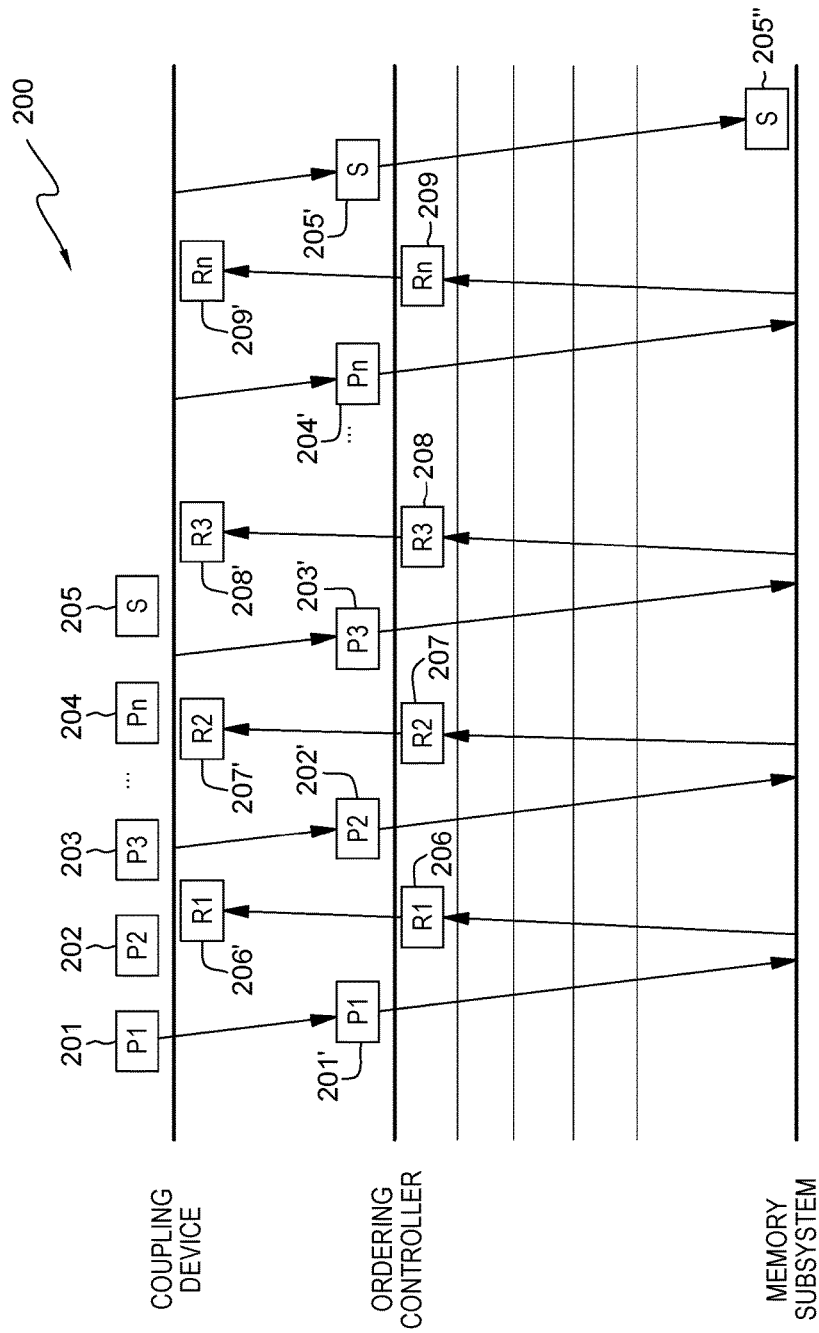
FIG. 2 is a diagram illustrating a first current implementation for coupling transactions, in accordance with an example of the first current implementation.
Figure 3:
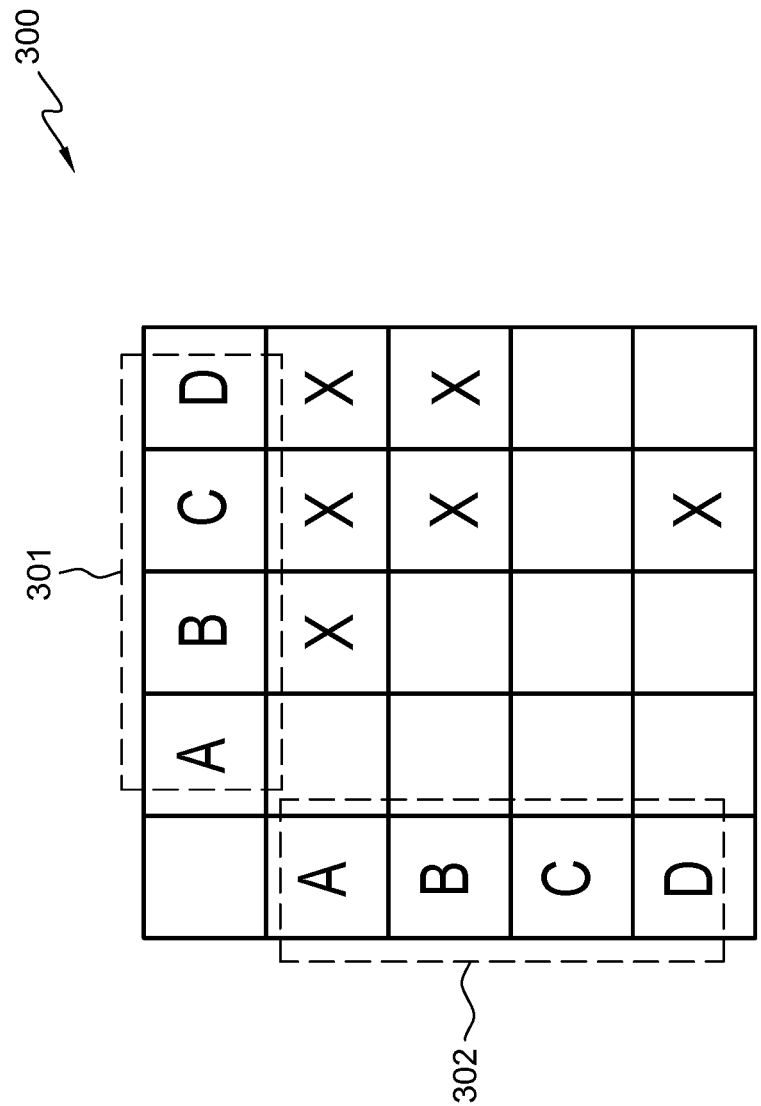
FIG. 3 is an example ordering matrix for a first current implementation shown in FIG. 2, in accordance with an example of the first current implementation.

FIG. 2 is a diagram showing current implementation 200 for coupling transactions, in accordance with an example of the first current implementation. In current implementation 200, the coupling device sends in all packets, including payload packets and signaling packets, into a memory subsystem and requests all the packets to be ordered. As shown in the example illustrated in FIG. 2, the coupling device sends payload packet P1 (denoted by numeral 201) to the ordering controller, and the ordering controller sends payload packet P1 (denoted by numeral 201') to the memory subsystem. In response to receiving payload packet P1, the memory subsystem sends response R1 (denoted by numeral 206). Next, in response to receiving response R1 (denoted by numeral 206'), the coupling device sends payload packet P2 (denoted by numeral 202) to the ordering controller and the ordering controller sends payload packet P2 (denoted by numeral 202') to the memory subsystem. In response to receiving payload packet P2, the memory subsystem sends response R2 (denoted by numeral 207). In response to receiving response R2 (denoted by numeral 207'), the coupling device sends payload packet P3 (denoted by numeral 203) to the ordering controller and the ordering controller sends payload packet P3 (denoted by numeral 203') to the memory subsystem. In response to receiving payload packet P3, the memory subsystem sends response R3 (denoted by numeral 208) to the coupling device. The coupling device receives response R3 (denoted by numeral 208'). After a certain number of payload packets are sent and their corresponding responses are received, the coupling device sends the n-th payload packet Pn (denoted by numeral 204) to the ordering controller and the ordering controller sends payload packet Pn (denoted by numeral 204') to the memory subsystem. In response to receiving payload packet Pn, the memory subsystem sends response Rn (denoted by numeral 209) to the coupling device. Finally, in response to receiving response Rn (denoted by numeral 209'), the coupling device sends signaling packet S (denoted by numeral 205) to the ordering controller and the ordering controller sends signaling packet S (denoted by numeral 205') to the memory subsystem.

Current implementation 200 shown in FIG. 2 is implemented as a matrix shown in FIG. 2. FIG. 3 is example ordering matrix 300 for first current implementation 300 shown in FIG. 2, in accordance with an example of first current implementation 200. By way of example, FIG. 3 shows an ordering matrix of 4×4 only. Each column and each row of the matrix represents a FSM. A set bit in the matrix means: FSM in column X needs to wait for FSM in row Y to finish before FSM X can continue. Ordering matrix 300 has only active entries for FSMs working on ordered commands and does not know anything about FSMs working on unordered commands; this means that a command with ordering indication can overtake an unordered operation because the matrix has no information about the unordered commands. Ordering matrix 300 gives the sequence of executing commands: row (denoted by numeral 301) of ordering matrix 300 waits for column (denoted by numeral 302) to finish. In ordering matrix 300, the sequence of executing commands is A then B, then D, and then C. Column A has no X (no bit is set), so command A does not need to wait for other commands. Column B has an X (a bit is set) in row A, so command B waits until command A is done and the X is deleted. Column D has an X (a bit is set) in each of row A and row B, so command D until commands A and B are completed. The command C is the last one to finish.

In current designs, the ordering controller maintains an ordering matrix (such as ordering matrix 300) has a size of N×N, where N is the number of packets that are active in the ordering controller at a given moment. A bit being set in the row M of the column N means that the FSM (finite state machine) N has an ordering dependency towards the FSM M (meaning that N has to be ordered behind M). In addition, the ordering controller maintains a table with a depth of N, where each bit indicates whether the FSM N is busy with an active ordered command. In the current implementation, when a command is received and an unordered bit is set, neither the ordering matrix nor the active ordered command table are updated. In the current implementation, when a command is received for the FSM N and the unordered bit is not set, the active ordered command table is copied into column N of the ordering matrix and the bit N in the active ordered command matrix is set. When a command M completes, the row M in the ordering matrix is reset, as well as the bit M in the active ordered command table.

Figure 4:
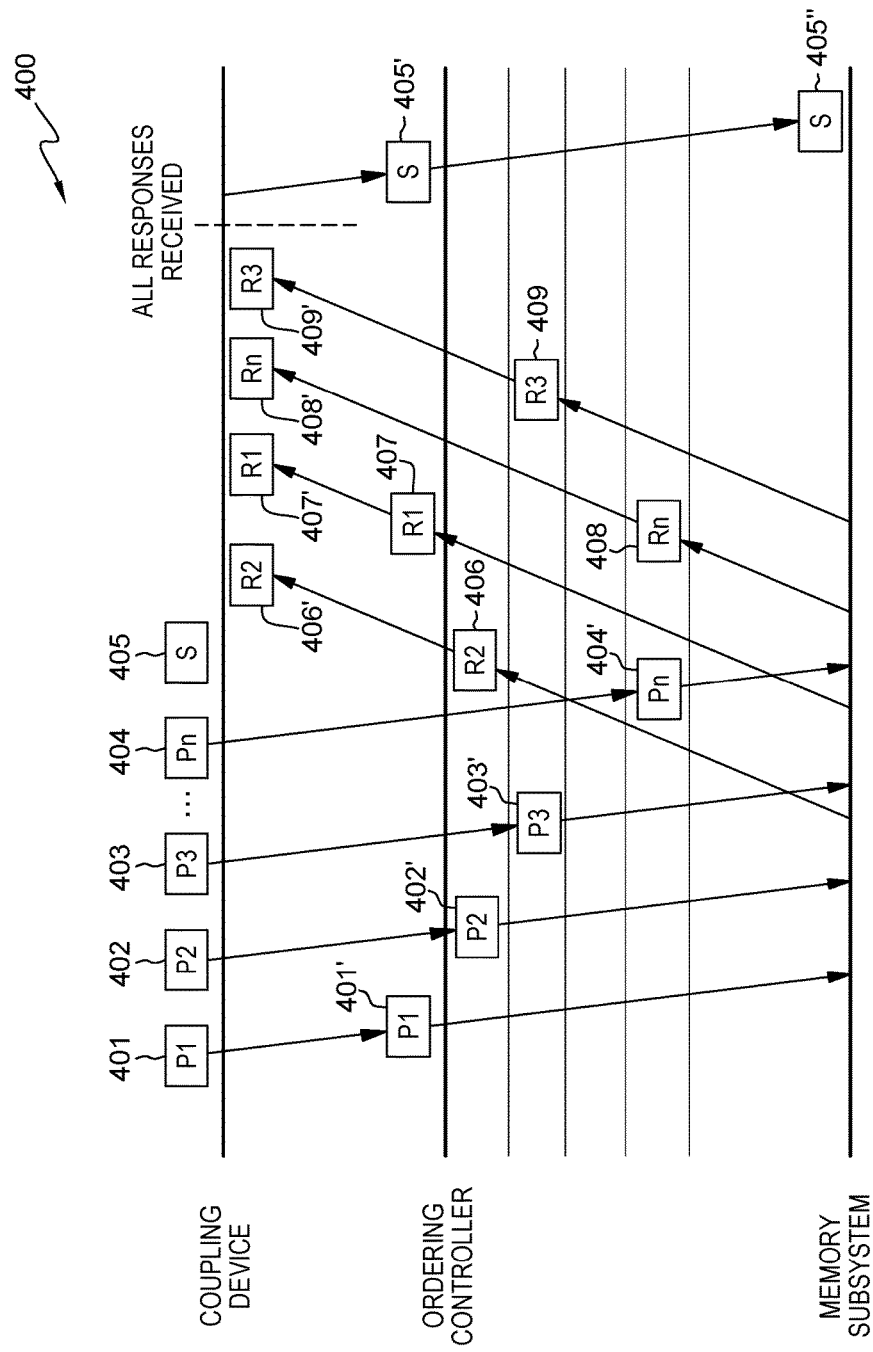
FIG. 4 is a diagram illustrating a second current implementation for coupling transactions, in accordance with an example of the second current implementation.

FIG. 4 is a diagram illustrating current implementation 400 for coupling transactions, in accordance with an example of current implementation 400. In implementation 400, in order to optimize throughput, the coupling device sends in payload packets associated with a coupling message back-to-back, with an indication to the memory subsystem not to impose ordering on the payload packets. The coupling device waits for all responses to be received for the payload packets. When all these responses have been received, the signaling packets, which is with the ordering flag being set, are sent in. Waiting for all payload packets to be fully completed before being able to send in a signaling packet leads to an additional latency penalty for an individual message. FIG. 4 shows that the coupling device sends all payload packets unordered and waits until all of the payload packets are complete before sending in the signaling packets. As shown in the example illustrated in FIG. 4, the coupling device sends payload packet P1 (denoted by numeral 401), payload packet P2 (denoted by numeral 402), payload packet P3 (denoted by numeral 403), . . . , and payload packet Pn (denoted by numeral 404) to the ordering controller and the ordering controller sends payload packets (denoted by numerals 401', 402', 403', and 404') to the memory subsystem. The coupling device sends the payload packets in an unordered mode. In response to receiving payload packets, the memory subsystem sends response R2 (denoted by numeral 406) corresponding to payload packet P2 (denoted by numeral 402), response R1 (denoted by numeral 407) corresponding to payload packet P1 (denoted by numeral 401), response Rn (denoted by numeral 408) corresponding to payload packet Pn (denoted by numeral 404), and response R3 (denoted by numeral 409) corresponding to payload packet P3 (denoted by numeral 403). In response to receiving all the responses (denoted by numerals 406', 407', 408', and 409'), the coupling device sends signaling packet S (denoted by numeral 405) to the ordering controller and the ordering controller sends signaling packet S (denoted by numeral 405') to the memory subsystem. The memory subsystem receive the signaling packet (denoted by numeral 405").

Now, detailed description of the embodiment of the present invention is provided as follows, with reference to FIG. 5 and FIG. 6.

Figure 5:
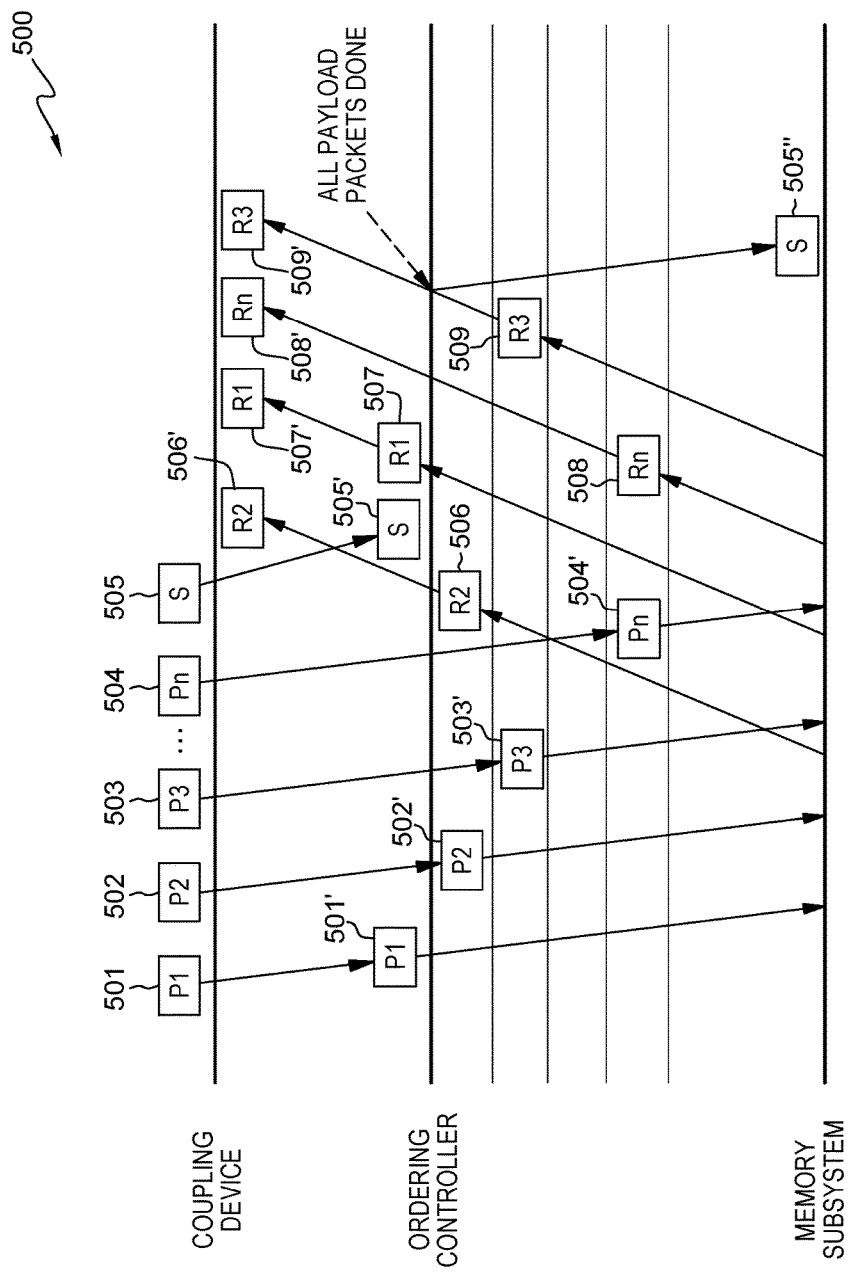
FIG. 5 is a diagram illustrating an implementation for coupling transactions, in accordance with one embodiment of the present invention.

FIG. 5 is a diagram illustrating implementation 500 for coupling transactions, in accordance with one embodiment of the present invention. FIG. 5 shows an example of the implementation in accordance with the present invention. As shown in FIG. 5, the coupling device sends payload packets P1, P2, P3, . . . , and Pn (denoted by numerals 501, 502, 503, and 504) back-to-back to the ordering controller. Same as in implementation 400, the unordered attribute is set for the payload packets. Unlike implementation 400, without waiting for all the responses to be received, the coupling device sends in signaling packet S (denoted by numeral 505) back-to-back to the ordering controller. Signaling packet S (505) is with ordering requested.

In response to receiving payload packets P1, P2, P3, . . . , and Pn (denoted by numerals 501', 502', 503', and 504'), the ordering controller sends payload packets P1, P2, P3, . . . , and Pn to the memory subsystem. The ordering controller sends payload packets in an arbitrary order. The ordering controller also receives signaling packet S (denoted by numeral 505'); however, the ordering controller does not send signaling packet S (denoted by numeral 505') to the memory subsystem until responses for all of payload packets P1, P2, P3, . . . , and Pn are received.

In response to receiving payload packets P1, P2, P3, . . . , and Pn (denoted by numerals 501', 502', 503', and 504'), the memory subsystem sends response R2 (denoted by numeral 506) corresponding to payload packet P2 (denoted by numeral 502), response R1 (denoted by numeral 507) corresponding to payload packet P1 (denoted by numeral 501), response Rn (denoted by numeral 508) corresponding to payload packet Pn (denoted by numeral 504), and response R3 (denoted by numeral 509) corresponding to payload packet P3 (denoted by numeral 503).

In response to that all the responses (denoted by numerals 506', 507', 508', and 509') are received, the ordering controller sends signaling packet S (denoted by numeral 505') to the memory subsystem. Thus, the memory subsystem receives signaling packet S (denoted by numeral 505") after all payload packets R1, R2, R3, . . . , and Rn are received. As shown in FIG. 5, before response R3 (denoted by 509') is received by the coupling device, the ordering controller already sends signaling packet S (denoted by numeral 505') to the memory subsystem. Therefore, compared to implementation 400 shown in FIG. 4, implementation 500 in the present invention reduces the latency for coupling messages.

In the implementation in accordance with the present invention, a coupling device (for example, an integrated cluster bus (ICB)) continues to send in the first data packets (for example, the payload packets) with the unordered attribute being set back-to-back; the coupling device also sends in the second data packets (for example, the signaling packets) back-to-back with ordering requested, instead of delaying the second data packets (for example, the signaling packets) and waiting until all the responses are received for all the first data packets (for example, the payload packets). An ordering controller (for example, a PCI bus controller (PBC)) introduces a new mode for handling the unordered indication, i.e., changing its semantics to a relaxed ordering indication. While unordered commands (for example, the payload operations) continue to not have an ordering relation towards each other, ordered commands (for example, the signaling operations) wait until all preceding commands (for example, payload operation) have completed, even if these preceding commands have the unordered flag set. Therefore, the ordering is guaranteed on a high level but the latency penalty in current implementations is removed. The latency penalty in the current implementations is caused by waiting for all payload packets to be fully completed and their completions to be signaled to the coupling device.

The present invention introduces an additional mode that can be enabled in a register in the ordering controller (for example, the PCI bus controller (PBC)). The mode leads to unordered operations being ordered in a relaxed ordering mode instead of no order at all. In terms of the existing ordering infrastructure, no change applies to a command being received with an unordered bit not set; this means that, with respect to setting the unordered bit, the coupling device (for example, the integrated cluster bus (ICB)) behaves exactly the same way as in current implementation 400 shown in FIG. 4. When command M is received with the unordered bit being set, instead of updating neither the ordering matrix nor the table of the active commands, only the ordering matrix is not updated. Even when the unordered bit is set for command M, the corresponding bit in the table of active ordered entries is set. In current implementation 400 shown in FIG. 4, an unordered command was not reflected in the ordering controller at all; in the present invention, the new bit is set to indicate that other commands need to wait for command M. In the present invention, when command M comes in, a bit M is needed to be set in a relaxed order matrix in the ordering controller, which indicates that other commands coming in later need to wait for command M. As a result, subsequent ordered commands (which come in after command M and have the unordered bit not set) are ordered towards the unordered commands, while the unordered commands are still unordered towards each other and other ordered commands. A relaxed command (whose bit is set in the relaxed order matrix) can overtake other commands but must not be overtaken by other commands which are not relaxed.

Figure 6:
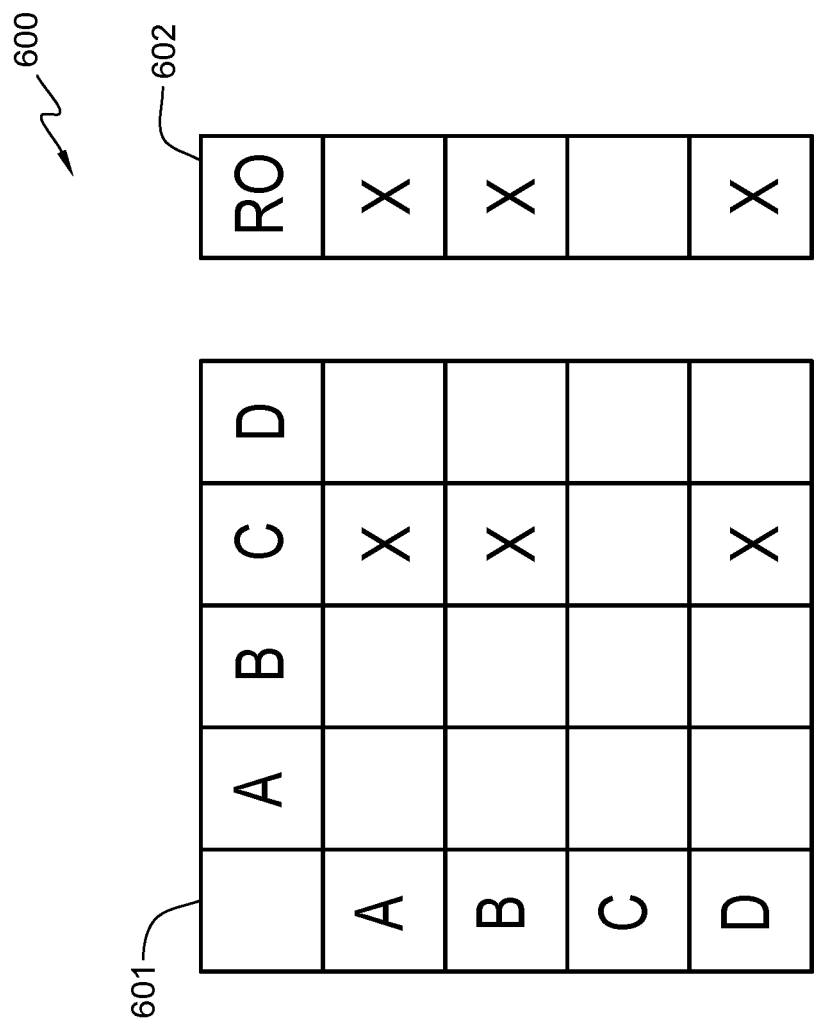
FIG. 6 is an example of a relaxed ordering matrix for an implementation shown in FIG. 5, in accordance with one embodiment of the present invention.

FIG. 6 is an example of relaxed ordering matrix 600 for implementation 500 shown in FIG. 5, in accordance with one embodiment of the present invention. By way of example, FIG. 6 shows relaxed ordering matrix 600 with a dimension of 4. The present invention introduces a new mode for handling the unordered indication—a relaxed ordering indication. In FIG. 6, 4×4 matrix 601 in relaxed ordering matrix 600 indicates a command (e.g., command C) needs to wait for other commands (e.g., commands A, B, and D), RO (relaxed order) column 602 in relaxed ordering matrix 600 indicates the other commands need to wait for the command. In the relaxed ordering matrix, there is a new bit field—RO column 602. The new bit field (RO column 602) indicates that FSM is in relaxed ordering (RO) mode. As shown in FIG. 6, when a new FSM C is used without a RO bit set, all FSMs in RO column 602 (e.g., commands A, B, and D) each having a RO bit set are completed before the new FSM C can continue. With the relaxed ordering mode, commands A, B, and D are executed in an arbitrary order, command C waits until commands A, B, and D are finished. In the embodiment of the present invention, for example, commands A, B, and D are for the payload operations (shown in FIG. 4) and command C is for the signaling operation (shown in FIG. 5).

Based on the foregoing, a computer system with a configurable ordering controller for coupling transactions has been disclosed. However, numerous modifications and substitutions can be made without deviating from the sprit and scope of the present invention. Therefore, the present invention has been disclosed by way of examples and not limitation.

What is claimed is:

1. A computer system with a configurable ordering controller for coupling transactions, the computer system comprising:
   a coupling device configured to send payload packets with an unordered attribute being set to an ordering controller;
   the coupling device configured to send a signaling packet with requested ordering to the ordering controller, back-to-back after the payload packets, before the coupling device receives from a memory subsystem responses indicating that the memory subsystem has received the payload packets; and
   the ordering controller configured to send the payload packets to the memory subsystem in a relaxed ordering mode which is enabled in a register in the ordering controller, wherein the ordering controller is in the relaxed ordering mode such that the ordering controller sends the payload packets to the memory subsystem in an arbitrary order and sends the signaling packet to the memory subsystem after the ordering controller has sent all of the payload packets to the memory subsystem.

2. The computer system of claim 1, wherein the relaxed ordering mode is implemented as a relaxed ordering matrix of dependencies in the ordering controller.

3. The computer system of claim 2, wherein the relaxed ordering matrix comprises a matrix indicating that commands for the signaling packet need to wait for commands for the payload packets.

4. The computer system of claim 2, wherein the relaxed ordering matrix further comprises a relaxed order column indicating the relaxed ordering mode for the payload packets.

5. The computer system of claim 4, wherein bits in the relaxed order column are set for commands for the payload packets, and wherein the bits in the relaxed order column are not set for commands for the signaling packet.

6. The computer system of claim 5, wherein the commands for the payload packets are executed in the arbitrary order.

7. The computer system of claim 5, wherein the commands for the signaling packet wait until the commands for the payload packets are completed.

8. The computer system of claim 1, wherein direct memory accesses with the relaxed ordering mode do not have ordering dependencies.

9. The computer system of claim 1, wherein direct memory accesses with the relaxed ordering mode set ordering dependencies for other succeeding commands.

10. The computer system of claim 1, wherein commands without the unordered attribute and without the relaxed ordering mode are ordered behind commands with the relaxed ordering mode.

* * * * *